United States Patent [19]
Dickert

[11] 3,872,034
[45] Mar. 18, 1975

[54] PHENOLIC FOAM
[75] Inventor: Eugene A. Dickert, Kansas City, Mo.
[73] Assignee: Cook Paint & Varnish Company, Kansas City, Mo.
[22] Filed: Feb. 2, 1973
[21] Appl. No.: 329,166

[52] U.S. Cl. ...................... 260/2.5 AM, 260/2.5 AJ
[51] Int. Cl. ...................... C08g 22/16, C08g 22/44
[58] Field of Search ....... 260/2.5 AM, 2.5 F, 2.5 AJ

[56] References Cited
UNITED STATES PATENTS

| | | | |
|---|---|---|---|
| 2,608,536 | 8/1952 | Sterling | 260/2.5 AM |
| 2,764,566 | 9/1956 | Simon | 260/2.5 AN |
| 2,806,006 | 9/1957 | Proctor | 260/2.5 AM |
| 3,034,996 | 5/1962 | Kaplan | 260/2.5 AF |
| 3,063,964 | 11/1962 | Khawam | 260/2.5 AM |
| 3,072,582 | 1/1963 | Frost | 260/2.5 AF |
| 3,282,896 | 11/1966 | Einberg | 260/2.5 AM |
| 3,632,531 | 1/1972 | Rush | 260/2.5 AJ |

Primary Examiner—M. J. Welsh
Assistant Examiner—C. Warren Ivy
Attorney, Agent, or Firm—Cushman, Darby & Cushman

[57] ABSTRACT

A resole phenolic rigid foam composition which is non-friable, non-corrosive and exhibits no "punking". The foam is obtained from a mixture of a resole phenolic resin, an organotin catalyst, an organic polyisocyanate and a blowing agent.

4 Claims, No Drawings

PHENOLIC FOAM

BACKGROUND OF THE INVENTION

Phenolic resin foams comprise a large number of foams which result from the condensation reaction of phenol or a phenol derivative and aldehydes. Although phenol is usually used, other phenol derivatives such as cardanol, resorcinol and alkyl-substituted phenols such as cresols, xylenols, m and p-tert-butylphenol, p-phenylphenol, and isopropylphenol may also be used. Various phenols or phenol derivatives are known in the art for making phenolic foams and are not critical to the present invention. The aldehydes that may be employed are formaldehyde, acetaldehyde, paraldehyde, furfuraldehyde, butyraldehyde, propionaldehyde, benzaldehyde. Formaldehyde is preferred and is most commonly used.

The reaction mechanisms for various molar ratios of the aldehyde to the phenol are well known. When using one or more moles of an aldehyde for one mole of phenol or phenol derivative, a one step thermosetting resin or resole resin is produced. When less than one mole of aldehyde and one mole of phenol are used a novolac resin results.

Foamed phenolic resins are well known as evidenced by reference to U.S. Pat. Nos. 2,906,717 and 3,298,973 as well as British Pat. Nos. 908,303 and 994,447. However, despite the wide use of phenolic foam resins, they have various drawbackds which prevent their use in various industrial fields. Since acid or basic catalyst are usually used, a corrosion problem is present with the various metals in the storage, pumping and mixing equipment needed for the production of the phenolic foam. It is disclosed in *Rigid Plastic Foams*, by T. H. Ferrigno, second edition 1967 Reinhold Publishing Company, at page 327 that if a diisocyanate is used without an acid catalyst, corrosion may be reduced but the mixture must be heated to 130° – 250°C to cause foaming. The high temperature heating is expensive and requires special equipment. Other drawbacks of conventional phenolic foams are that at densities less than 3 lbs per ft³ — the foams are quite brittle, thus, limiting their utility in a number of fields. Because most phenolic foam resins are friable, corrosive and non-fire resistant, limited use of such resins represented by U.S. Pat. No. 2,906,717 and British Pat. No. 908,303 is achieved. Fire resistance can be improved by the incorporation of a heat-operable foaming agent, as shown by British Pat. No. 994,447, but the resulting product is still friable and corrosive. Prior art phenolic foam resins also exhibit a punking effect which is an after glow when ignition is attempted.

Non-acids or non-basic catalysts have been employed in the production of novolac foam resins with glycol solvents in order to reduce the high curing temperatures but such resins still suffer from the other drawbacks previously noted. Such novolac resins are represented by U.S. Pat. Nos. 3,499,861, 3,497,465 and 2,993,871.

THE PRESENT INVENTION

It is the object of the present invention to produce a non-friable, fire resistant resole phenolic resin foam which exhibits no punking and only needs room temperature curing. This is accomplished by using an organotin catalyst which thereby avoids the corrosive acid or basic catalyst systems of the prior art.

It is also the object of the present inventions to combine the use of the organotin catalyst with an organic polyisocyanate and the resole resin to produce a non-friable, non-punking resole phenolic foam.

It is further the object of the present invention to produce an improved resole phenolic foam by the combined reaction of a resole resin, an alkylene glycol, a phosphate plasticizerflame retardant, an organotin catalyst, a polysilicone surfactant, an orgainc polyisocyanate, and a blowing agent. This improved resin can be cured at room temperature, is not corrosive, exhibits no punking, is non-friable and has more uniform and stronger cell structure than the prior art resole phenolic foams.

The present invention involves the preparation of a phenolic resin foam from resole resins with improved properties. The idealized form of a resole resin is shown below:

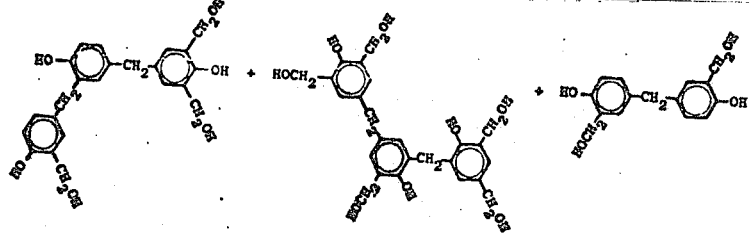

A typical resole resin available in commercial form is sold by Union Carbide Corporation and is identified as BAKELITE Phenolic Resin BRL-2760. Its properties are as follows:

| Properties | Required Values |
|---|---|
| Viscosity at 25°C.,cps | 1,850–2,400 |
| ph Value | 6.0 to 6.8 |
| Nonvolatile Matter, per cent | 78–81 |

The idealized phenolic foam structure (acid catalyzed system) may be represented as:

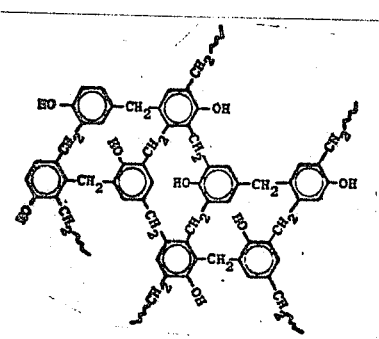

In the present invention the resole resin may comprise any reaction product of the phenols or phenol derivatives and aldehydes which are well known in the art.

The catalysts used in the process of the present invention are non-acidic organotin catalysts. The particular organic structure for the organotin catalyst is not critical; it is only necessary that tin be present since the tin is the basic catalytic agent. Examples of suitable organotin catalysts are stannous oxalate, stannous oleate, stannous chloride, stannous formate, etc. Any organotin compound which is not volatile or subject to decomposition at the initial reaction temperature (which is not higher than 90°F) and which is soluble in the reaction mixture will suffice for the present invention. A less active catalyst will be used in higher concentrations than a more active catalyst. Preferred catalysts are reaction products of stannous oxide (SnO) or dibutyltin oxide with a carboxylic acid having 1 to 20 carbon atoms. A preferred catalyst is stannous octoate (stannous 2-ethylhexoate) $Sn(C_8H_{15}O_2)2$, which is a reaction product of stannous oxide and 2-ethylhexoic acid. Examples of catalysts derived from dibutyltin oxide are dibutyltin diacetate, dibutyltin di (2-ethylhexoate) and dibutyltin dilaurate. The preferred catalysts are dibutyltin dilaurate, stannous octoate and Markure UL-2, available from Argus Chemical Company. Stannous chloride has been used in the condensation of phenols with aliphatic aldehydes, but it is not known to have been used in the formation of a rigid resole phenolic foam. See Catalysis by Berkman et al, Reinhold Publishing Company, 1940.

If low density (less than 1.5 lbs/ft$^3$) foams are desired, the reaction mixture preferably includes an alkylene glycol of 2 to 10 carbon atoms such as ethylene glycol, butylene glycol and propylene glycol or an ether of an alkylene glycol of 2 to 10 carbon atoms such as diethylene glycol and dipropylene glycol. The preferred glycol is dipropylene glycol. High molecular weight polyols are to be avoided in the present invention since they produce a weak cell structure. An example of such polyols are Jefferson Chemicals "Thanol" polyols. High density foams of the present invention (1.5 lbs/ft$^3$ or greater) need not include the alkylene glycol, although it is preferred since the glycol reduces the punking of the foam.

The reaction mixture of the present invention includes an organic polyisocyanate to reduce friability and to complete the reaction of the desired phenolic resin. The organic polyisocyanate preferrably contains two isocyanate groups formed by the reaction of diamines with phosgene. Examples of such polyisocyanates are polymethylene diisocyanate; alkylene diisocyanates such as propylene - 1, 2 - diisocyanate, butylene - 1, 3 - diisocyanate; alkylidene diisocyanates such as ethylidene diisocyanate, and heptylidene diisocyanate; cycloalkylene diisocyanates such as cyclopentylene - 1, 3 - diisocyanate, etc. The preferred diisocyanate is diphenyl methane diisocyanate which is available under the trademark Mondur MR and has the following properties:

| | |
|---|---|
| Boiling point, initial, °C, 1mm Hg | 170 |
| Freezing point | 8°C(46°F) |
| Specific gravity, 20°C | 1.25 |
| Viscosity, cps, 25°C | 150–250 |
| Assay, % | approx. 88–90 |
| NCO, % | approx. 30–31 |
| Hydrolyzable chloride, % | approx. 0.2 |
| Total chloride, % | approx. 0.2 |
| Solids, content, % | approx. 1.0 |

Other suitable polyisocyanates include Mondur CB-75, Mondur CB-10, Mondur M and Mondur MO.

Various foaming agents or blowing agents are added to the present resole phenolic resins in various amounts to control the density and cellular structure of the foams. These blowing agents are all well known in the art and any one or more of these can be used for present purposes.

The most effective blowiing or foaming agents for use herein are short chain, low boiling point, halogenated organic compounds. The boiling point must be below 90°F and the carbon chain can have from 1 to 3 carbon atoms. The halogen can be chlorine, bromine, or fluorine, preferably fluorine or a combination of fluorine and chlorine. Examples of such blowing agents are halogenated alkanes such as chloromethane, dichloromethane, trichloromethane, trichlorormonofluoromethane, trifluoromonochloro-methane, 1, 1, 1 trichloro-ethane, and 2, 2-difluoro-propane. The preferred blowing agent is trichloromonofluoro-methane.

it is to be understood that in the foamed resins of this invention there may also be present other ingredients and agents to impart other desirable properties such as pigments, dyes, fillers, stabilizers, neutralizers, etc., without departing from this invention.

Many well known surfactants may also be added to the resole phenolic foams of the present invention to promote uniform cell structure throughout the resin. The choice of the surfactant is not critical to the present invention and may be chosen from a wide variety of surfactants such as metallic soaps, alkylene oxide phenol addition products, fatty acid esters, ester phosphatides, alkyl aryl sulfates and sulfonates, alkyl aryl polyether alcohols and silicone polymers. An example of an alkyl aryl polyether alcohol is Triton X-100. Suitable silicone polymers include condensation products of alkylene oxides and siloxanes which can be random, block or graft silicone polymers such as Dow Corning Silicone DC 195 or DC 193 and Union Carbide's Silicone L-5340, L-530, L-5310, L-5320 and L-501. Typical properties of the silicone surfactants are listed below:

| | L-530 | L-5310 | L-5320 | L-501 |
|---|---|---|---|---|
| Form | liquid | soft wax | liquid | paste |
| Melting point, °F | . . . | 90–95 | 60 | . . . |
| Viscosity, 25°C, centistokes | 1000–2000 | 200–400* | 40 | . . . |
| Color, Gardner standard | 4 | 6 | Lt. straw | white |
| Cloud point, 1% water solution, °F | 86 | 147 | . . . | . . . |
| Specific gravity, 25/25°C | 103 | 1.07 | 1.07** | 1.48 |
| Flash point, °F | >510 | . . . | 250 | 600 |

*at 35°C

It is also preferred to incorporate a flame retardant in the foam to reduce the fire hazared of the foam. More preferably the fire retardant is also a plasticizer, e.g., halo-organic phosphates. The organic substituent of the halo-organic phosphate is not critical so long as the phosphate has a boiling point above the reaction temperature and the halogen/carbon ration is sufficiently hight to possess fire retardancy properties. The preferred plasticizer-flame retardants are tris(chloroethyl) phosphate and tris(2,3-di-bromopropyl) phosphate. The latter is available in commercial form as Firemaster T-23-P.

The present resole phenolic foams can be prepared by thoroughly mixing the resole resin, organic polyisocyanate, blowing agent, catalyst and other desired additives, molding the reaction mixture into the desired shape and then curing at a temperature below 90°F. The various ingredients can be added in any order in the mixing procedure.

The proportions of the various ingredients are not narrowly critical and can be varied depending on the desired properties of the foam. The proportions are expressed on a weight percentage of the reaction mixture unless otherwise specified. The resole resin may vary from about 20% to about 30%. The alkylene glycol need not be used in the reaction mixture but, as noted, it is preferable to strengthen cell structure and reduce punking. The improved cell structure is particularly noticed in low density foams. Thus, the operable range of the alkylene glycols is 0% to 20 and more preferably from about 6% to about 15%. The combined flame retardant and plasticizer may vary from about 3% to about 25% and more preferably from about 5% to about 15%. The catalyst concentration varies depending on the activity of the catalyst and the desired speed of the reaction but usually will be used in an amount of from about 0.01% to about 3%, and more preferably from about 0.1% to about 1%. The surfactant may vary over a wide range of about 0.01% to about 20%; however, for economical reasons only about 0.1% to about 2% is needed. The organic polyisocyanate has a critical range of operation from about 30% to about 60% and more preferably 45% to 55%. The blowing or foaming agent may be varied over a wide range depending on the desired density, i.e., the lower the density, the higher the concentration of the blowing agent. The concentration will usually vary from about 1% to about 30% and more preferably about 3% to about 20%.

A particularly preferred foam composition is obtained from a mixture of a resole resin, dipropylene glycol, tris(chloroethyl) phosphate, dibutyltin dilaurate, a polysilicone surfactant, trichloro monofluoro methane and diphenyl methane diisocyanate. The operable and preferred ranges of the ingredients of this highly preferred foam are the same as the ranges discussed in the previous paragraph.

The invention is further illustrated by the following specific examples.

Example No. 1

| Component B | |
|---|---|
| Phenolic Resin BRL-2760 (resole resin) | 52.6 g. |
| Dipropylene Glycol (solvent-reactant) | 17.4 g. |
| Tris (Chloro Ethyl) Phosphate (plasticizer-flame retardant) | 29.0 g. |
| Dibutyl tin dilaurate (catalyst) | .3 g. |
| Dow Corning Silicone DC 195 (surfactant) | .7 g. |
| | 100.0 g. |
| Viscosity of "B" Component | 900 cps at 77°F |

| Component A | |
|---|---|
| Mobay Mondur MR (isocyanate) | 70 g. |
| Trichloro Monofluoro Methane (blowing agent) | 30 g. |
| | 100 g. |
| Viscosity of "A" Component | 15 cps at 75%F |
| Reaction Ratio A/B by Weight | 57/43 |

The A and B components were mixed at about 2000 rpm with a paint stirrer in an electric drill and poured into a polyethylene container. Reactivity data was as follows:

| | |
|---|---|
| Mixing Time | 45 seconds |
| Initiation (Cream) Time | 55 seconds |
| Rise Time | 1 minute, 35 seconds |
| Tack Free Time | 1 minute, 50 seconds |

Free rise core density of the foams in small buns varied between 0.91 and 1.08 pounds per cubic foot. The foam was fine celled and non-friable. It resisted ignition and would not flare up. There was no evidence of punking, glowing after removal of a flame applied for testing the self-extinguishing property.

Example No. 2

| "B" Component | | | | |
|---|---|---|---|---|
| Phenolic Resin BRL-2760 | | | 57.56 g. | |
| Dipropylene Glycol | | | 24.67 g. | |
| Tris (Chloro Ethyl) Phosphate | | | 16.44 g. | |
| Dibutyl tin dilaurate | | | .33 g. | |
| Dow Corning Silicone DC 195 | | | 1.00 g. | |

| Foam Number | No. 1 | No. 2 | No. 3 | No. 4 |
|---|---|---|---|---|
| "B" Component | 121 g. | 121 | 121 | 121 |
| "A" Component | | | | |
|   Mobay Mondur MR | 150 g. | 150 | 150 | 150 |
|   Trichloro monofluoro Methane | 15 g. | 20 | 25 | 30 |
| Foam Density, lbs./cu. ft. | 1.10 | 1.10 | 1.10 | 1.04 |
| Foam Bun Appearance | Undercut under top | Less Undercut than No. 1 | Less Undercut than No. 2 | No undercut |

Thus the density was little affected by the addition of blowing agent, but the bun shape was improved.

The following example shows the effect of changing the amount of isocyanate, the diphenyl methane diiocyanate crude, referred to as Mobay's Mondur MR.

Example No. 3

| "B" Component | |
|---|---|
| Phenolic Resin BRL-2760 | 50.95 g. |
| DiPropylene Glycol | 21.80 g. |
| Tris (Chloro Ethyl) Phosphate | 14.54 g. |
| DiButyl Tin Dilaurate | .36 g. |
| Dow Corning Silicone DC 195 | 1.45 g. |
| Trichloro Monofluoro Methane | 10.90 g. |
| | 100.00 g. |

| Foam Numbers | No. 1 | No. 2 | No. 3 | No. 4 |
|---|---|---|---|---|
| "B" Component | 137 g. | 137 | 137 | 137 |
| "A" Component | | | | |
| Mobay Mondur MR | 110 g. | 120 | 140 | 150 |
| Foam Appearance | Internal splits | Internal splits | General splits | No splits |
| Foam Density, lbs/cu.ft. | 1.45 | 1.12 | 1.20 | 1.20 |

Thus, the best foams were produced at the highest level of isocyanate in Foam No. 4 above.

Example No. 4, which follows shows that foams were of lesser quality at the lower densities when the alkylene glycol solvent (dipropylene glycol) was omitted:

Example No. 4

| Foam Numbers | 1 | 2 | 3 | 4 | 5 | 6 |
|---|---|---|---|---|---|---|
| Resin BRL-2760 | 100 | 100 | 100 | 100 | 100 | 100 |
| DC 195 | 2 | 2 | 2 | 2 | 2 | 2 |
| Tris (Chloro Ethyl) Phosphate | 10 | 10 | 15 | 20 | 10 | 10 |
| DiButyl Tin Dilaurate | 0.5 | 0.5 | 0.5 | 0.5 | 0.5 | 0.5 |
| Trichloro Monofluoro Methane | 10 | 20 | 20 | 30 | 30 | 30 |
| Mobay Mondur MR | 100 | 100 | 100 | 100 | 130 | 70 |
| Density, lbs./cu.ft. | 1.66 | 1.58 | 1.42 | 1.3 | 1.2 | — |
| Foam | Good | Good | very slightly soft | slightly flexible weak | weak | very weak |

In the above foams, the attempt to reduce density resulted in weak foam without the inclusion of the alkylene glycol (dipropylene glycol).

Use of other high molecular weight other than the described alkylene glycols (dipropylene glycol) also failed in these foams collected under Example No. 5.

Example No. 5

| Foam Number | 1 | 2 | 3 |
|---|---|---|---|
| Resin BRL-2760 | 80 g. | 80 g. | 100 g. |
| Jefferson Thanol R-350X | 20 g. | — | — |
| Jefferson Thanol SF-265 | — | 20 g. | — |
| Jefferson Thanol TE 3000 | — | — | 10 g. |
| Silicone DC 195 | 2 g. | 2 g. | 2 g. |
| DiButyl Tin Dilaurate | 0.5 g. | 0.5 g. | 0.5 g. |
| Tichloro Monofluoro Methane | 20 g. | 10 g. | 10 g. |
| Mobay Mondur MR | 100 g. | 130 g. | 100 g. |
| Foam | weak | weak, and easily crumbled | weak, pebbly cells |

Thanol 265 and 350 are amino triols with a molecular weight approximating each respective number. The Thanol TE 3000 is a propylene oxide derivative of glycerin with the addition of ethylene oxide, the resulting molecular weight being about 3000.

It is to be noted that the omission of the alkylene glycol produced a foam that exhibited punking (after glow) in the test for fire retardance. This foam is shown in Example No. 6.

Example No. 6

| Resin BRL-2760 | 100 g. |
|---|---|
| DC 195 | 2 g. |
| Tris (Chloro Ethyl) Phosphate | 10 g. |
| DiButyl Tin Dilaurate | 0.5 g. |
| Trichloro Monofluoro Methane | 10 g. |
| Mobay Mondur MR | 100 g. |
| Foam Density, lbs./cu. ft. | 1.66 g. |
| Foam | Good |

This foam was tested in the Monsanto Tunnel Test and had a low flame spread rating but punked, i.e., it continued to glow after the flame was removed. Other phenolic resins foams containing dipropylene glycol as already described did not punk.

I claim:

1. A rigid resole phenolic foam which is non-corrosive, free from punking, non-friable and of uniform and strong cell structure with a density of up to about 1.5 lbs/ft$^3$, said foam being obtained by foaming and curing at a temperature below 90°F, a reaction mixture expressed on the basis of weight percentages of the reaction mixture consisting of from about 15% to about 55% of a resole resin; from about 6% to about 20% of an alkylene glycol selected from the group consisting of ethylene glycol, butylene glycol, propylene glycol, diethylene glycol and dipropylene glycol; from about 3% to about 25% of a halo-organic phosphate plasticizer-flame retardant which has a boiling point above the reaction temperature and a halogen/carbon ratio sufficiently high to possess fire retardant properties; from about 0.01% to about 3% of stannous chloride or non-acidic organotin catalyst; from about 0.01% to about 20% of a surfactant; from about 30% to about 60% of a difunctional diisocyanate; and from about 1% to about 30% of a blowing agent which is a halogenated alkane having 1 to 3 carbon atoms and a boiling point below 90°F.

2. The rigid foam according to claim 1 wherein the resole resin is from about 20% to about 50%; the alkylene glycol is from about 6% to about 15%; the halo-organic phosphate is from about 5 to about 15%; the catalyst is from about 0.1% to about 1%; the surfactant is from about 0.1% to about 2%; the difunctional isocyanate is from about 45% to about 55%; and the blowing agent is from about 3% to about 20%.

3. A rigid resole phenolic foam according to claim 1 obtained from the reaction mixture consisting essentially of from about 20% to about 30% of a resole resin; from about 6% to about 15% of dipropylene glycol; from about 5% to about 15% of tris(choro ethyl) phosphate; from about 0.1% to about 1% of dibutyl tin dilaurate; from about 0.1% to about 2% of a polysilicone polymer; from about 45% to about 55% of diphenyl methane diisocyanate; and from about 3% to about 20% of trichloro monofluoro methane.

4. A method of making a rigid resole phenolic foam which is non-corrosive, free from punking, non-friable and of uniform and strong cell structure with a density of up to about 1.5 lbs/ft$^3$, said method comprising: first, mixing a reaction mixture expressed on the basis of weight percentages of the reaction mixture comprising from about 15% to about 55% of a resole resin; from about 6% to about 20% of an alkylene glycol selected from the group consisting of ethylene glycol, butylene glycol, propylene glycol, diethylene glycol and dipropylene glycol; from about 3% to about 25% of a halo-organic phosphate plasticizerflame retardant which has a boiling point above the reaction temperature and a halogen/carbon ratio sufficiently high to possess fire retardant properties; from about 0.01% to about 3% of stannous chloride or non-acidic organotin catalyst; from about 0.01% to about 20% of a surfactant; from about 30% to about 60% of a difunctional isocyanate; and from about 1% to about 30% of a blowing agent which is halogenated alkane having 1 to 3 carbon atoms and a boiling point below 90°F, and allowing the mixture to foam and cure at a temperature below 90°F.

* * * * *